July 11, 1950 W. E. RAMSEY 2,514,898
COMBINATION COTTON PICKER AND INSECT CATCHER
Filed March 8, 1949 2 Sheets-Sheet 1

Inventor
William E. Ramsey

By Clarence A. O'Brien
and Harvey B. Jacobson
Attorneys

July 11, 1950  W. E. RAMSEY  2,514,898
COMBINATION COTTON PICKER AND INSECT CATCHER
Filed March 8, 1949  2 Sheets-Sheet 2
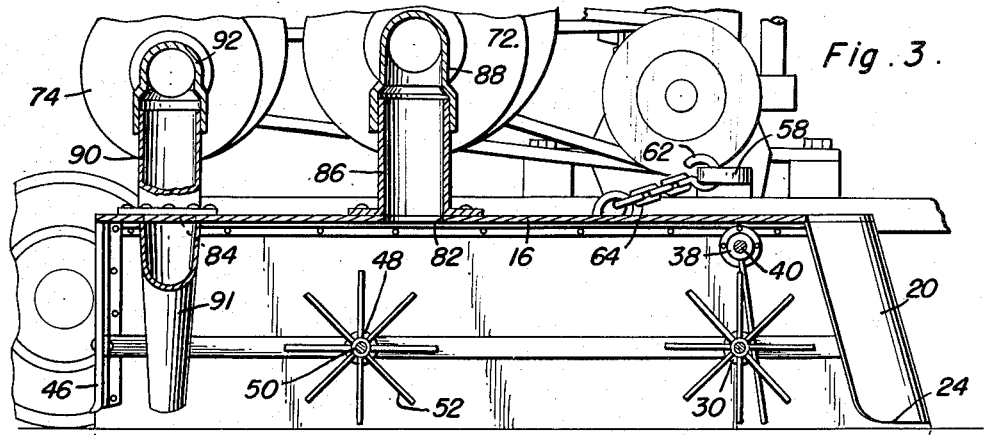
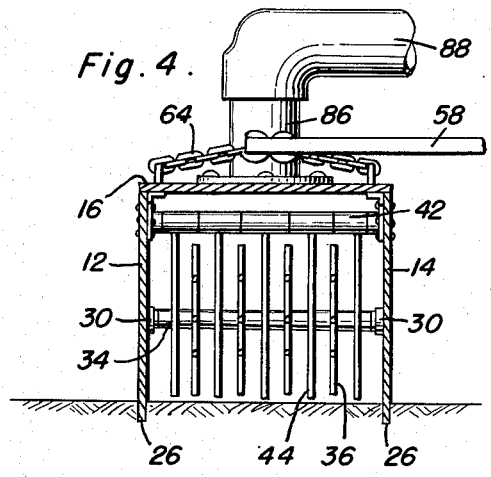
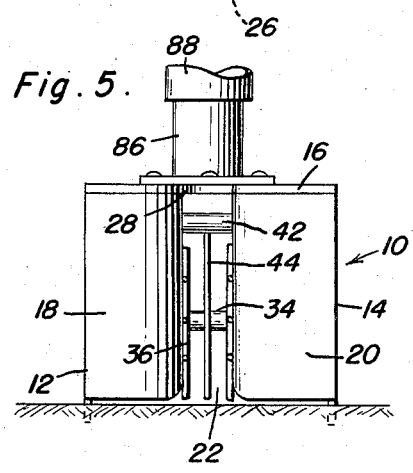
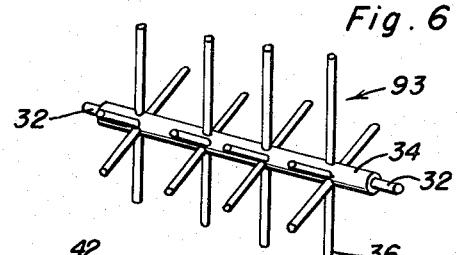
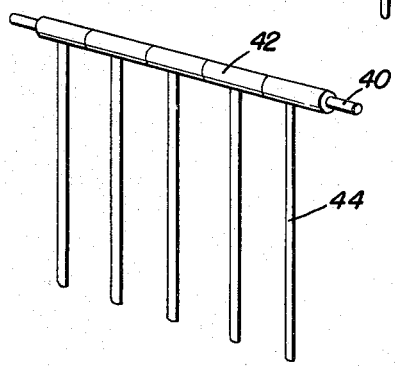
Inventor
William E. Ramsey
By Clarence A. O'Brien
and Harvey B. Jacobson
Attorneys Patented July 11, 1950

2,514,898

UNITED STATES PATENT OFFICE 2,514,898

COMBINATION COTTON PICKER AND INSECT CATCHER

William E. Ramsey, Stanton, Tex.

Application March 8, 1949, Serial No. 80,274

3 Claims. (Cl. 56—30)

This invention relates to new and useful improvements in argicultural implements and the primary object of the present invention is to provide a combination cotton picker and insect catcher.

Another object of the present invention is to provide a machine for picking or harvesting cotton and embodying a novel and improved means for removing and eliminating insects from cotton and other row crops, said means comprising agitators enclosed within a hollow body of sufficient width to cover a row of cotton and of a length sufficient to enclose the agitators.

A further object of the present invention is to provide a cotton picker and insect catcher including a hollow body having side walls that extend into the ground during sliding movement of the body over a row of cotton, agitating means for cotton stalks entering the body and suction means for delivering cotton from the body to a suitable collecting receptacle that moves with the body.

A still further aim of the present invention is to provide a machine of the aforementioned character that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is an enlarged, longitudinal vertical sectional view taken substantially on the plane of section line 3—3 of Figure 2;

Figure 4 is an enlarged, transverse vertical sectional view taken substantially on the plane of section line 4—4 of Figure 2;

Figure 5 is an enlarged front elevational view of the hollow body illustrated in Figure 2.

Figure 6 is a perspective view of one of the rotary agitators used in conjunction with the present invention; and Figure 7 is a perspective view of the swingable agitator or combing element used in conjunction with the present invention.

Figure 1:
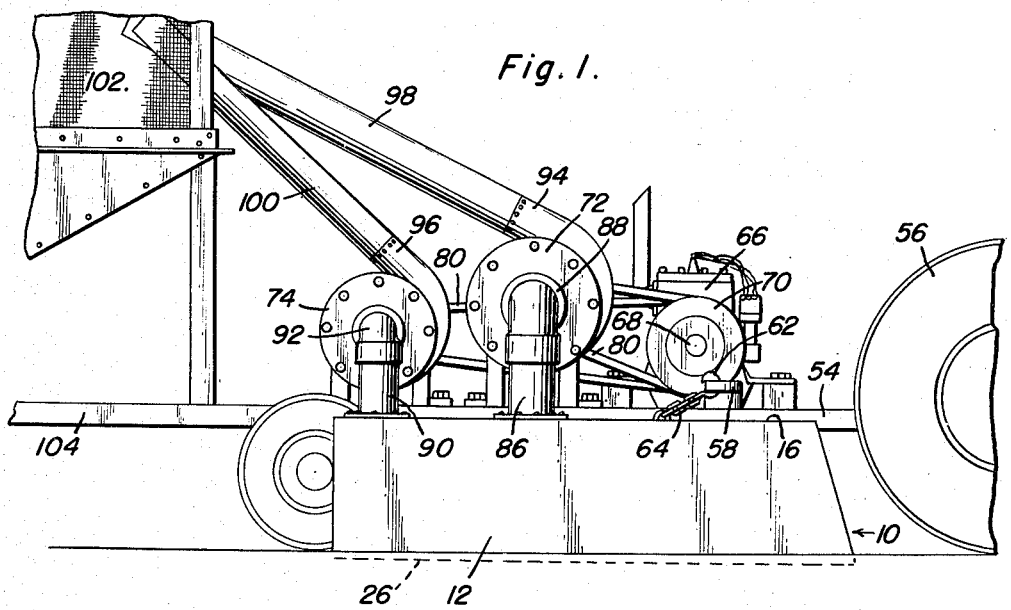
Figure 1 is a fragmentary side elevational view of the present invention.
Figure 2:
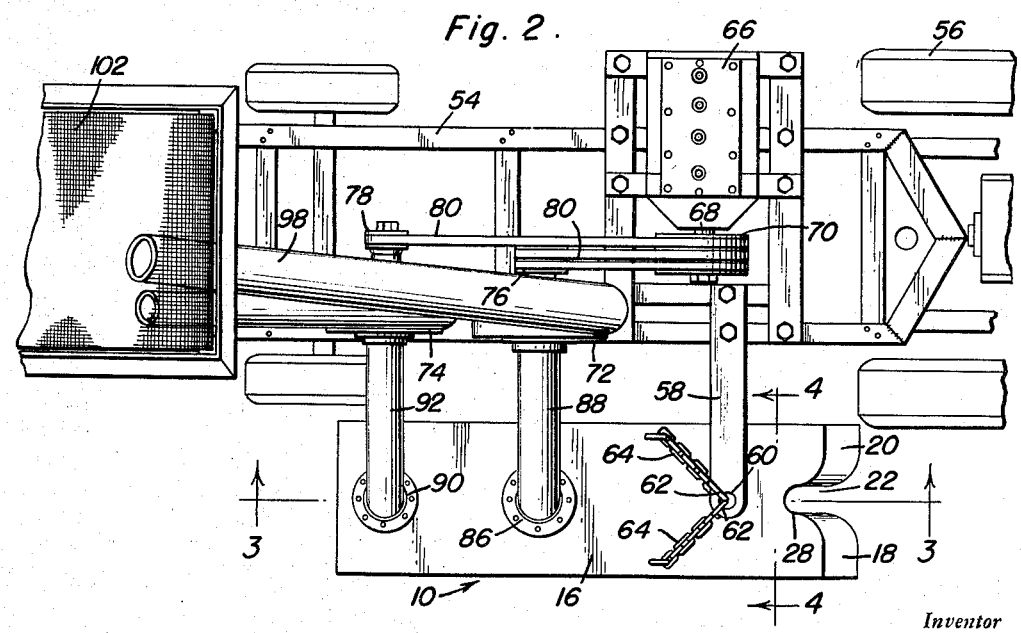
Figure 2 is a top plan view of Figure 1.

Referring now to the drawings in detail, wherein for the purpose of illustration, there is disclosed a preferred embodiment of the present invention, the numeral 10 represents the elongated hollow body having spaced parallel side walls 12 and 14 and an upper wall 16.

The forward end portions of the side walls 12 and 14 are bent inwardly and rearwardly on an arc to provide a pair of convexed forward portions 18 and 20 that are spaced to define an entrance opening 22. The lower edges 24 of the portions 18 and 20 are spaced above the lower longitudinal edges 26 of the side walls 12 and 14 for a purpose which will later be more fully described, and the forward end of the upper wall 16 is formed with a concaved recess or notch 28 in vertical alignment with the opening 22.

Journaled for rotation in a forward pair of bearings 30, disposed adjacent the portions 18 and 20, and on the side walls 12 and 14, are the reduced ends 32 of a transverse shaft 34. The shaft 34 supports a plurality of longitudinally spaced sets of circumferentially spaced fingers or arms 36 that will engage cotton stalks and rotate as the body 10 moves forward.

Disposed directly above the shaft 34 and mounted in suitable brackets or bearings 38 carried by the side walls 12 and 14, is a further shaft 40 that receives a plurality of sleeves 42. Each of the sleeves 42 is fixed to a downwardly extending arm or finger 44 and the arms 44 are staggered with respect to the aforementioned arms 36 and bear against the shaft 34 at a vertically inclined position as shown best in Figure 3 of the drawings.

Adjacent the rear open end 46 of the body 10 is provided a further pair of bearings 48 that receive the reduced end portions of a rear shaft 50. The shaft 50 is similar in construction to the shaft 34 and therefore supports a plurality of longitudinally spaced sets of circumferentially spaced fingers or arms 52.

The numeral 54 represents a wheeled support or frame work that is suitably hitched to a towing vehicle or tractor 56. The support 54 includes a laterally projecting substantially horizontal arm 58 that is disposed perpendicular to the body 10. The outer end of the arm 58 is provided with an opening 60 that receives hooks 62 mounted on chains 64 which are fixed to the upper wall 16 of the body 10.

Mounted on the support 54 is a suitable motor 66 having a driving shaft 68 that supports a multipulley 70. Forward and rear fan housings 72 and 74 are also mounted on the support 54 and house suction fans (not shown) having driven shafts that support pulleys 76 and 78 respectively. The pulleys 76 and 78 are connected to the pulley 70 by endless belts 80.

The upper wall 16 is provided with a forward opening 82 disposed slightly forward of the shaft 50 and a rear opening 84 disposed adjacent the rear end of the slide. A forward enlarged conduit 86 rises from the wall 16 and opening 82 and is connected to the intake conduit 88 of the housing 72, and a further conduit 90 rises from the wall 16 and opening 84 and is connected to the intake conduit 92 of the housing 74.

The outlet conduits 94 and 96 of the housings 72 and 74 are secured to upwardly and rearwardly inclined delivery conduits 98 and 100 that enter a screened collecting receptacle 102 mounted on the rear portion 104 of the support 54.

In practical use of the present invention, the towing vehicle or tractor 56 moves forwardly and thereby pulls the support 54 and the body 10 forward with the lower edges 26 of the side walls 12 and 14 extended into the ground to increase the effectiveness of the suction fans for creating a suction in the body 10.

Cotton stalks or the like are guided into the slide by the portions 18 and 20 and are combed, separated and agitated by the arms 36 and 44 so that the cotton or insects will be sucked into the conduit 86 and delivered to the receptacle 102.

The cotton stalks are subjected to a further agitation when contacting the arms 52 and further cotton is sucked into the conduit 90 or the ends of a U-shaped conduit 91 whose web is aperture to register with the opening 84, whereupon the cotton will be delivered to the receptacle 102.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A combination cotton picker and insect catcher comprising a wheeled support, a hollow body carried by said support and having an entrance opening and an exit opening, means mounted in said hollow body for agitating cotton stalks during movement of said hollow body, means for creating a suction in said hollow body, said last mentioned means including a conduit, a collecting receptacle receiving cotton from said conduit, said first mentioned means including a plurality of shafts journaled for rotation on said hollow body, a plurality of fingers fixed to and projecting laterally from said shafts, said shafts being rotated by cotton stalks contacting said fingers during movement of said body, and means for combing and spreading cotton stalks entering the hollow body.

2. A combination cotton picker and insect catcher comprising a wheel support, a slide carried by said support and including a hollow body having an entrance opening and an exit opening, means mounted in said body for agitating cotton stalks during movement of said slide, means for creating a suction in said hollow body, said last mentioned means including a conduit, means mounted within said body for combing and spreading cotton stalks entering the hollow body, and a collecting receptacle receiving cotton from said conduit, said last named means including a swingable support mounted in said body and having a plurality of depending arms bearing against one of the shafts.

3. A combination cotton picker and insect catcher comprising a wheeled frame, a slide carried by said frame and including an elongated hollow body having opening at each end, said body being open at its bottom and including a pair of elongated side walls, cotton plant agitating means disposed within the body and journaled for rotation on the side walls, a swingable support mounted in said body and including a plurality of depending arms contacting said agitating means, said body including an upper wall supporting said support, and means mounted on the frame and connected to the upper wall of said body for creating a suction in the body.

WILLIAM E. RAMSEY.

REFERENCES CITED

The following references are of record in the file of this patent:

UNITED STATES PATENTS

| Number | Name | Date |
|---|---|---|
| 371,372 | Savage | Oct. 11, 1887 |
| 685,111 | Donnelly | Oct. 22, 1901 |
| 949,260 | Childs | Feb. 15, 1910 |
| 1,036,357 | Skoer | Aug. 20, 1912 |
| 1,400,522 | Cannon | Dec. 20, 1921 |
| 1,457,420 | Bender | June 5, 1923 |
| 1,713,398 | Rountree | May 14, 1929 |